United States Patent [19]
Hara et al.

[11] 4,017,787
[45] Apr. 12, 1977

[54] SWITCHING REGULATOR HAVING A LOAD RESPONSIVE ALTERNATE BIASING CIRCUIT

[75] Inventors: Hirohito Hara, Fujisawa; Hironori Shimamura, Yokohama, both of Japan

[73] Assignee: Nippon Electronics Memory Industry Co. Ltd., Tokyo, Japan

[22] Filed: July 9, 1975

[21] Appl. No.: 594,603

[30] Foreign Application Priority Data

Dec. 5, 1974  Japan .................... 49-140153

[52] U.S. Cl. ............................. 321/45 S; 321/2; 321/9 A; 321/18
[51] Int. Cl.² .................................. H02M 7/00
[58] Field of Search ............... 321/2, 9 A, 18, 19, 321/45 S

[56] References Cited
UNITED STATES PATENTS

| | | | |
|---|---|---|---|
| 3,458,796 | 7/1969 | Cassady | 321/45 S |
| 3,701,937 | 10/1972 | Combs | 321/2 |
| 3,733,540 | 5/1973 | Hawkins | 321/18 X |
| 3,769,568 | 10/1973 | Hamilton et al. | 321/19 |
| 3,843,919 | 10/1974 | Yamamura et al. | 321/2 |
| 3,906,251 | 9/1975 | Tanida et al. | 321/18 X |
| 3,914,679 | 10/1975 | Sullivan | 321/18 X |

*Primary Examiner*—William M. Shoop
*Attorney, Agent, or Firm*—Burgess Ryan and Wayne

[57] ABSTRACT

The invention discloses a switching regulator for use in a power supply system for an electric computer. The input from a DC or AC power supply is converted into the high frequency pulses, stepped up or down in voltage and rectified into the DC output to be supplied to a load. The power to be supplied to the load may be varied by changing the pulse duration of the high frequency pulses in response to the difference voltage representing the difference between the voltage across the load and the reference voltage. At starting, the internal circuits are biased with the power supplied from the power supply, but during the operation they are biased with said DC output or the output from the preceeding circuits.

4 Claims, 3 Drawing Figures

SWITCHING REGULATOR HAVING A LOAD RESPONSIVE ALTERNATE BIASING CIRCUIT

BACKGROUND OF THE INVENTION

The present invention relates to a switching regulator for use in a power supply system for an electric computer.

In the conventional power supply systems for the electric computers, the AC voltage is stepped down by a transformer and rectified, and the current and voltage to be applied to a load are controlled by power transistors in a control unit. The variation both in load and input is compensated by the voltage stored in the power transistors. Therefore, when the load is increased, the voltage stored in the power transistor is increased so that the heat dissipation (the magnitude of which is the product of the stored voltage with the load current) occurs, thus resulting in the considerable loss in energy.

In order to overcome the above problem, the same inventors proposed the switching regulator of the type in which the input from the power supply is converted into the high frequency pulses whose pulse duration is changed depending upon the variation in load, whereby the power supply may be varied in response to the variation in load. In the switching regulator of the type described, however, the voltage which is derived by stepping down the power supply voltage by a low frequency transformer is used as the driving voltage for the pulse duration changing unit. Since the low frequency transformer used is large in size and heavy in weight, the switching regulator itself becomes large in size and heavy in weight. Furthermore, the power supply voltage is stepped down so that the magnitudes of the currents flowing through the various circuits are high, resulting in the thermal losses that cannot be neglected and in the decrease in overall efficiency.

SUMMARY OF THE INVENTION

In view of the above, one of the objects of the present invention is to provide a switching regulator compact in size, light in weight and highly reliable in operation.

Another object of the present invention is to provide a switching regulator in which the internal circuits are biased by the power supply at starting and are biased, during the operation, with the bias current derived from the secondary of the output high frequency transformer, whereby a low frequency transformer may be eliminated.

Briefly stated, according to the present invention, the input from the power supply is converted into the high frequency pulses, stepped up in voltage and rectified into the DC power to be supplied to the load. The pulse duration of the high frequency pulses is varied in response to the variation in load so that the constant output voltage may be maintained. At starting, the internal circuits in the switching regulator are biased by the power supply, but during the operation they are biased with the output voltage or the voltage derived from the preceeding stage.

DESCRIPTION OF THE PREFERRED EMBODIMENT

Figure 1:
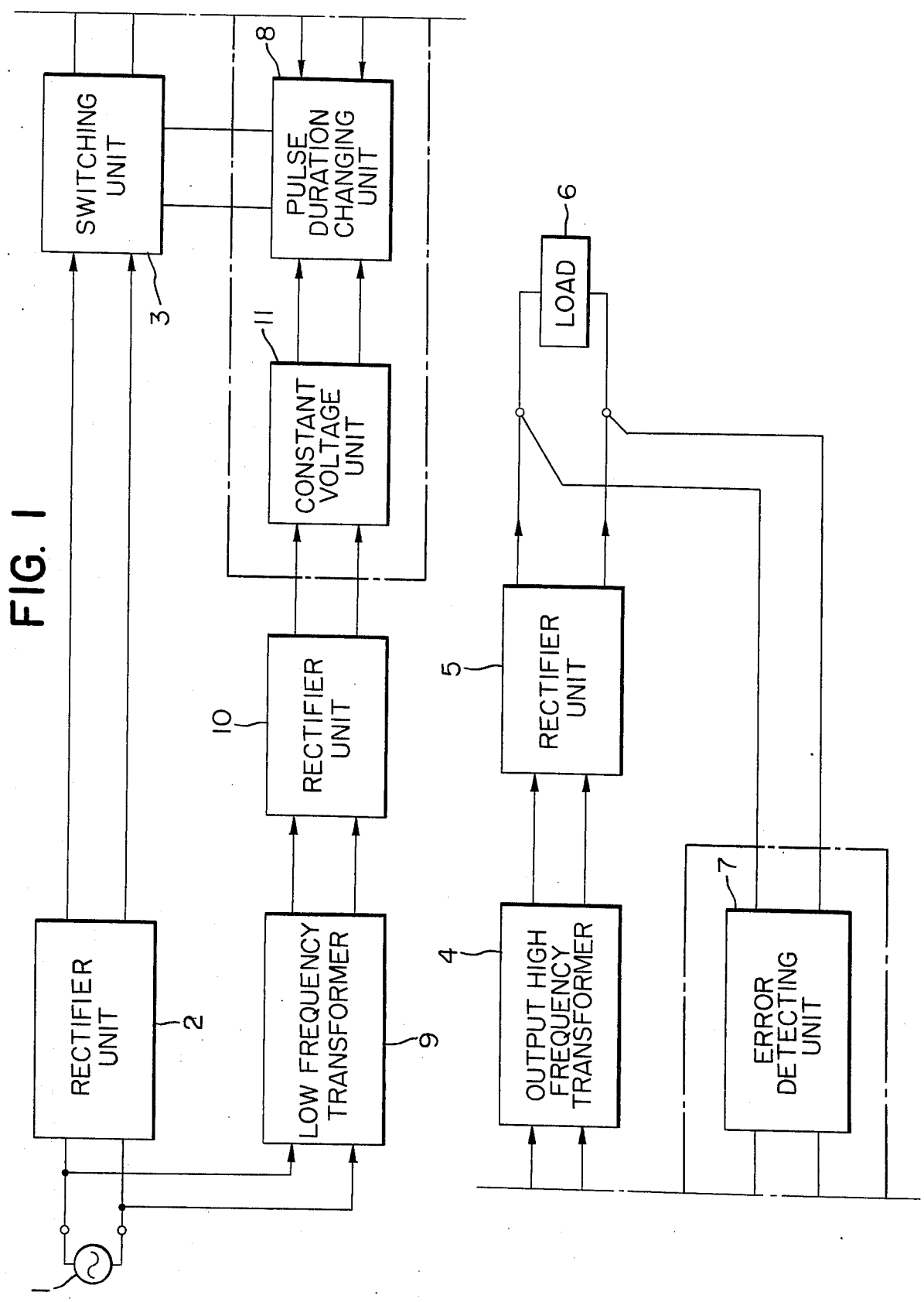
FIG. 1 is a block diagram of a conventional switching regulator.

Prior Art, FIG. 1

FIG. 1 shows the prior art switching regulator in which the input from an AC power supply unit 1 is rectified by a rectifier unit 2 and then converted into the high frequency pulses by a switching unit 3, the output of which is stepped down or up by an output high frequency transformer 4 and then rectified by a rectifier unit 5 into the direct current to be supplied to a load 6. The voltage across the load is detected by an error detecting unit 7, and the difference from the reference voltage is fed back to a pulse duration changing or control unit 8 which applies the difference voltage from the error detector unit 7 to the switching unit 3 so that the pulse duration of the high frequency pulses may be varied in response to the difference voltage, whereby the voltage across the load 6 may be maintained constant. The input from the AC power supply unit 1 is also stepped down by a low frequency transformer 9 and is rectified by a rectifier unit 10 into the direct current which is supplied to a constant voltage unit or voltage regulator 11. That is, the input to the pulse duration changing unit 8 is the constant voltage supplied from the constant voltage unit 11 thereby giving rise to the following problems. Firstly, the low frequency transformer 9, which is large is size and heavy in weight, inevitably results in the large and heavy switching regulator. Since the voltage supplied from the AC power supply 1 is stepped down, the biasing of the internal circuits causes the thermal losses, thus resulting in the decrease in efficiency of the switching regulator.

Figure 2:
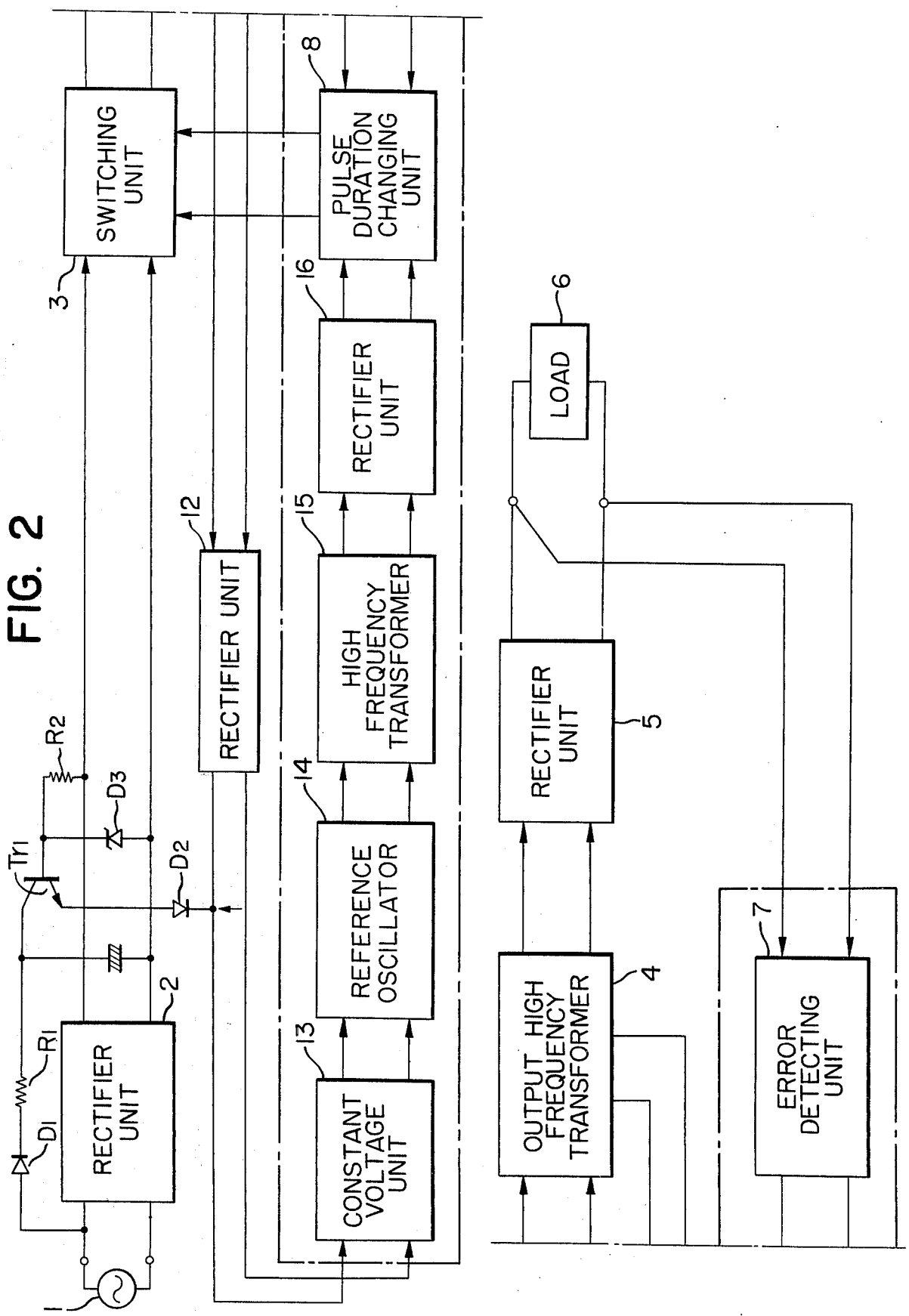
FIG. 2 is a block diagram of a switching regulator in accordance with the present invention.
Figure 3:
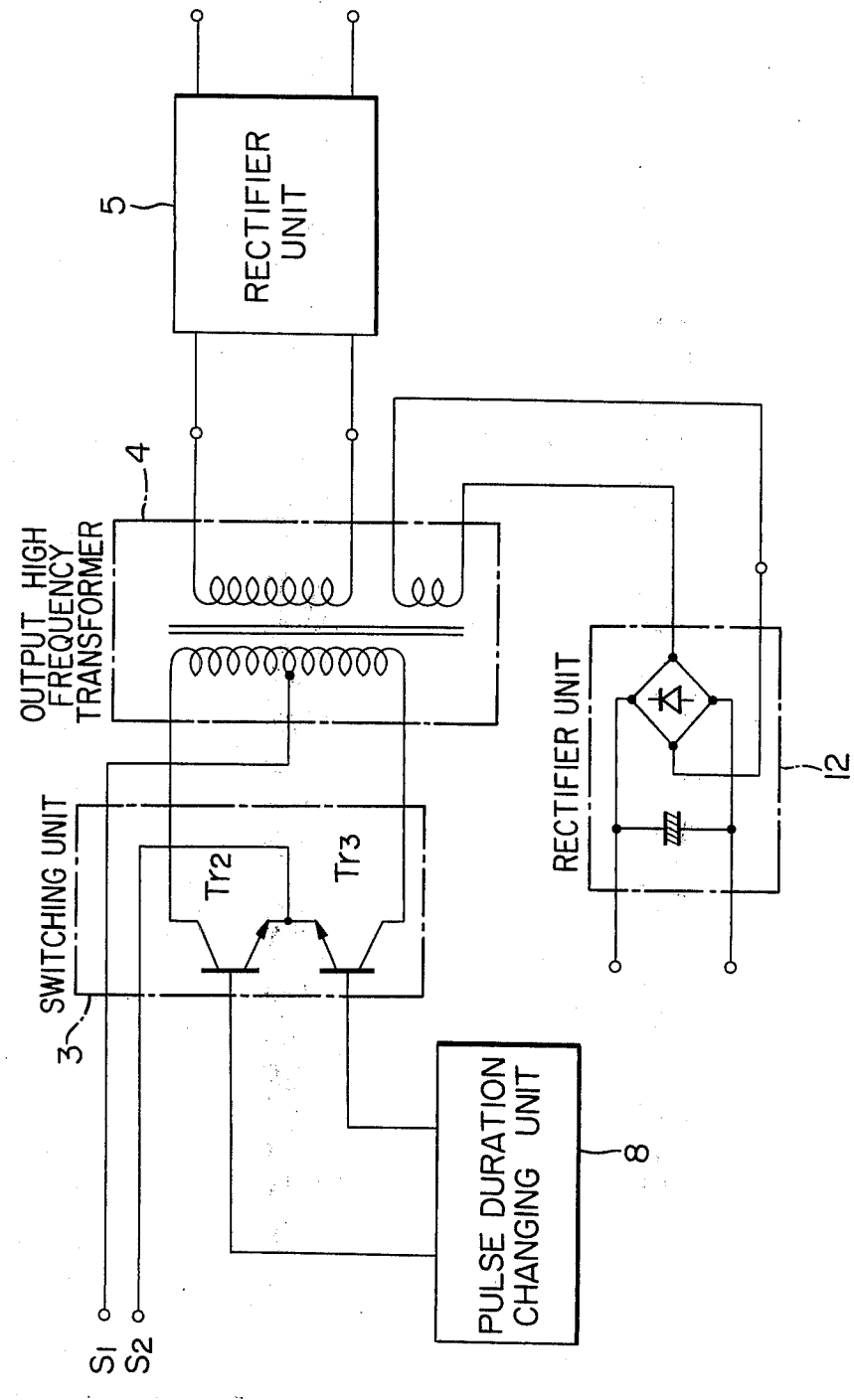
FIG. 3 is a circuit diagram of the major components thereof.

The Invention, FIGS. 2 and 3

In the preferred embodiments shown in FIG. 2 of the present invention, the AC power supply 1, the rectifier unit 2, the switching unit 3, the high frequency transformer 4, the rectifier unit 5, the load 6, the error sensor 7 and the pulse duration changing unit 8 are similar in construction and operation to those shown in FIG. 1, but the input to the pulse duration changing unit 8 is derived from the high frequency transformer 4 and a circuit for deriving the input at the starting is inserted. That is, the output from the high frequency transformer 4 is rectified by a rectifier unit 12 to be applied to a constant voltage unit 13. In response to the constant voltage output from the unit 13, a reference oscillator 14 is actuated which may be a multivibrator. The output from the oscillator 14 is stepped up or down in voltage by a high frequency transformer 15 and rectified by a rectifier unit 16 into the direct current for biasing the pulse duration changing unit 8 and the error detector 7.

The switching unit 3, the high frequency transformer 4 and the rectifier units 5 and 12 are shown in detail in FIG. 3. Unless the pulse duration changing unit 8 is activated the output cannot be derived from the high frequency transformer 4 so that the switching regulator remains de-activated as will be described in detail hereinafter.

Referring still to FIG. 3, transistors $T_{r2}$ and $T_{r3}$ in the switching unit 3 have their bases connected to the pulse duration changing unit 8. The emitters of the transistors $T_{r2}$ and $T_{r3}$ are connected to each other and to an input terminal $S_2$ while the collectors are connected to the primary of the high frequency transformer 4. The voltage across the secondary of the high frequency transformer 4 is applied as the input to the pulse duration changing unit 8. Thus, even when the input from the rectifier unit 2 is applied to the input terminals $S_1$ and $S_2$ of the switching unit 3, no output can be derived from the high frequency transformer 4 unless the input is applied to the transistors $T_{r2}$ and $T_{r3}$ in the switching unit 3. In order to actuate the switching circuit 3, as shown in FIG. 2, one output terminal of the AC power supply 1 is connected through a diode $D_1$ and a resistor $R_1$ to the collector of a transistor $T_{r1}$ whose emitter is connected through a diode $D_2$ to the positive terminal of the rectifier unit 12. The base of the transistor $T_{r1}$ is connected through a resistor $R_2$ to the positive output terminal of the rectifier unit 2 and to the negative output terminal of the rectifier unit 2 through a zener diode $D_3$.

Next the mode of operation of the switching regulator with the above construction will be described. When the power supply 1 is energized, the transistor $T_{r1}$ conducts so that the half-wave rectified current is applied to the constant voltage unit 13. In response to the output from the constant voltage unit 13, the reference oscillator 14 is actuated, the power is supplied through the high frequency transfomer 15 and rectifier unit 16 to the pulse duration changing unit 8. Since the load 6 is not connected yet, the pulse duration of the output pulses from the output high frequency transformer 4 is narrow so that the output voltage derived from the diode $D_2$ is higher than that derived from the rectifier unit 12. Consequently, the output from the rectifier unit 12 cannot actuate the pulse duration changing unit 8. The voltage $V_a$ at the junction of the diode $D_2$ with the output terminal of the rectifier unit 12 is given by $$V_a = V_{D3} - V_{D2} - V_{BE1}$$

where
$V_{D3}$ = voltage across the zener diode $D_3$;
$V_{D2}$ = voltage across the diode $D_2$; and
$V_{BE1}$ = voltage from the base to the emitter of the transistor $T_{r1}$.

That is, the voltage $V_a$ is the output voltage which is controlled by the transistor $T_{r1}$ whose reference voltage is the voltage across the diode $D_3$.

When the load 6 is connected, the voltage drop across it is detected by the error sensor 7 so that the error signal is applied to the pulse duration changing unit 8, which functions so as to increase the pulse duration of the output pulses from the switching unit 3. When the pulse duration is increased, the power passing through the rectifier unit 12 is increased so that the output voltage from the unit 12 becomes higher than that from the diode $D_2$. Therefore, the output voltage from the diode $D_2$ is cut off, and the biasing current is generated and applied to the internal circuits.

So far the power supply has been described as the AC power supply, but it is to be understood that the DC power supply may be also used. In FIG. 3, an additional coil is added to the transformer 4 so that the power for the internal circuits may be obtained, but the output may be derived from the preceding or suceeding stage of the rectifier unit 5.

What is claimed is:

1. A switching regulator for driving a load characterized by comprising
   a. a power supply;
   b. a pulse converter for converting the input from said power supply into the high frequency pulses;
   c. an output unit for stepping up or down the voltage of the output pulses from said pulse converter and rectifying them;
   d. an error detecting unit for detecting the variation in output voltage from said output unit;
   e. a pulse duration changing unit for changing the pulse duration of the output pulses from said pulse converter in response to the output from said error detecting unit;
   f. first biasing means for biasing, during the driving of said load, said pulse duration changing unit with the output from said output unit; and
   g. a second biasing means for initially biasing said pulse duration changing unit with the power supplied from said power supply, and means responsive to the driving of said load for blocking the flow of current from said second biasing means to said pulse duration changing unit.

2. A switching regulator as set forth in claim 1 wherein said first biasing means comprises
   a rectifier unit connected to an output of said output unit,
   a constant voltage unit connected to an output of said rectifier unit,
   a reference oscillator unit connected to an output of said constant voltage unit,
   a high frequency transformer unit connected to an output of said reference oscillation unit, and
   a rectifier unit having an input connected to an output of said high frequency transformer and having an output connected to an input of said pulse duration changing unit,
   whereby the output from said output unit, whose voltage is maintained at a constant level by said constant voltage unit, may be supplied to said pulse duration changing unit.

3. A switching regulator as set forth in claim 1 wherein said second biasing means comprises
   a transistor connected to said power supply and to said current flow blocking means, said transistor conducting when said power supply is connected, whereby constant voltage may be applied through said second biasing means to said pulse duration changing unit.

4. A switching regulator comprising
   a. a power supply;
   b. a pulse converter for converting the input from said power supply into the high frequency pulses;
   c. an output unit for stepping up or down the voltage of the output pulses from said pulse converter and rectifying the output pulses;
   d. an error detecting unit for detecting the variation in output voltage from said output unit;
   e. a pulse width changing unit for changing the pulse width of the output pulses to said pulse converter in response to the output from said error detecting unit;
   f. a first applying means for applying, at the starting, said pulse width changing unit with the power supplied from said power supply; and
   g. a second applying means for applying, during the operation, said pulse width changing unit with the output from said output unit.

* * * * *